Sept. 26, 1939.   R. C. TALBOT   2,174,426
AUTOMATIC ADJUSTING DEVICE
Filed July 26, 1937   4 Sheets-Sheet 1
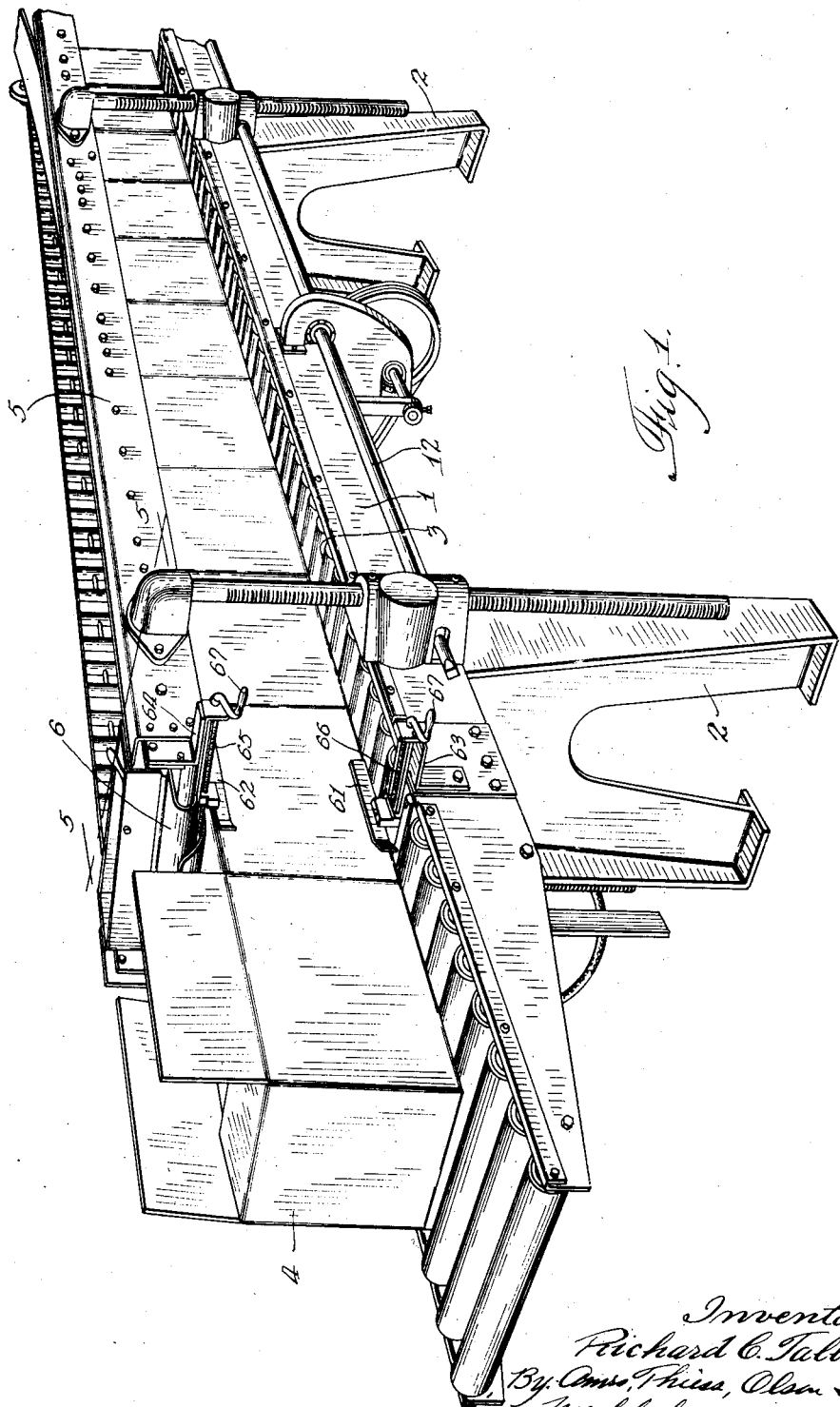

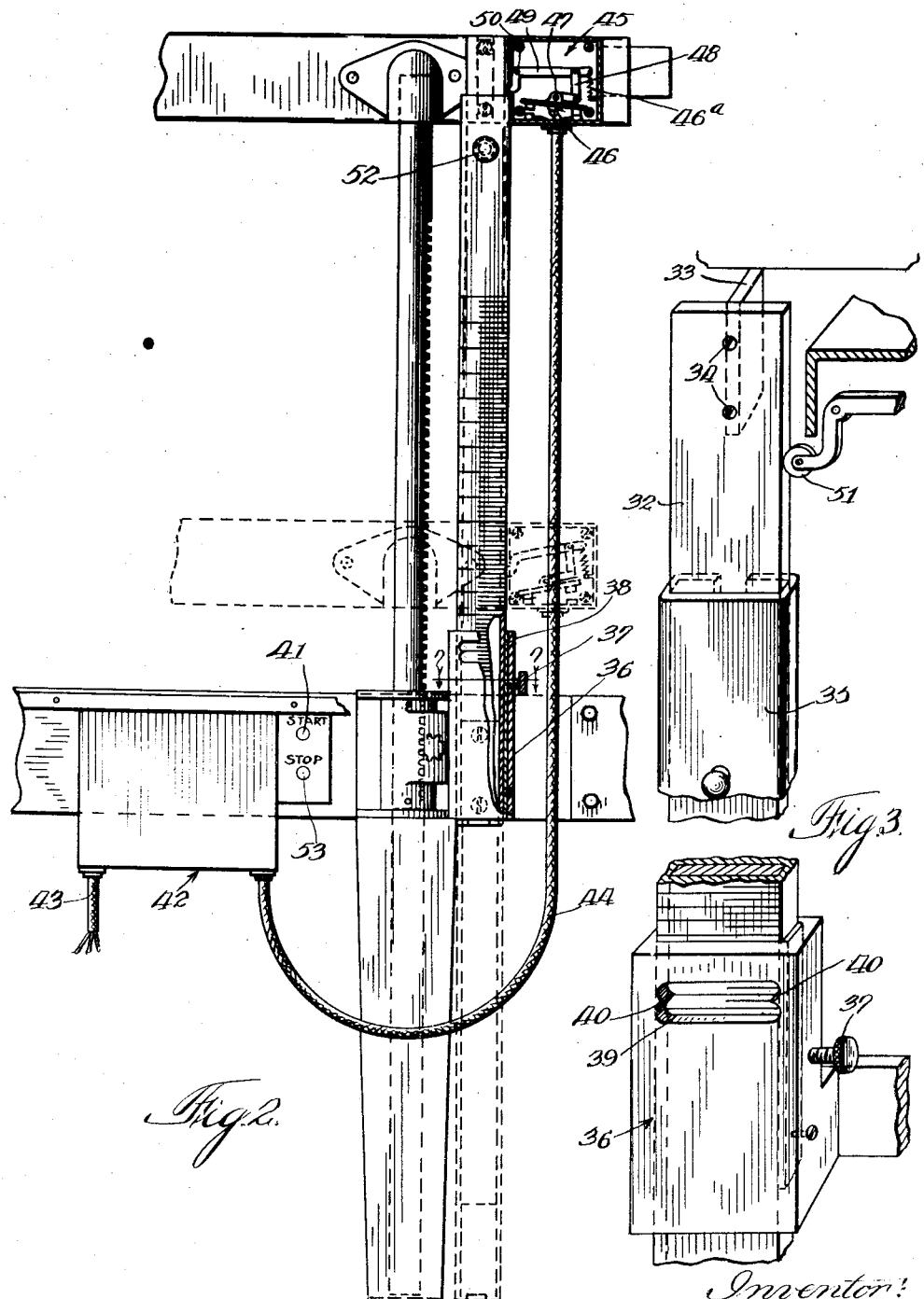

Sept. 26, 1939.　　　　R. C. TALBOT　　　　2,174,426
AUTOMATIC ADJUSTING DEVICE
Filed July 26, 1937　　　4 Sheets-Sheet 3
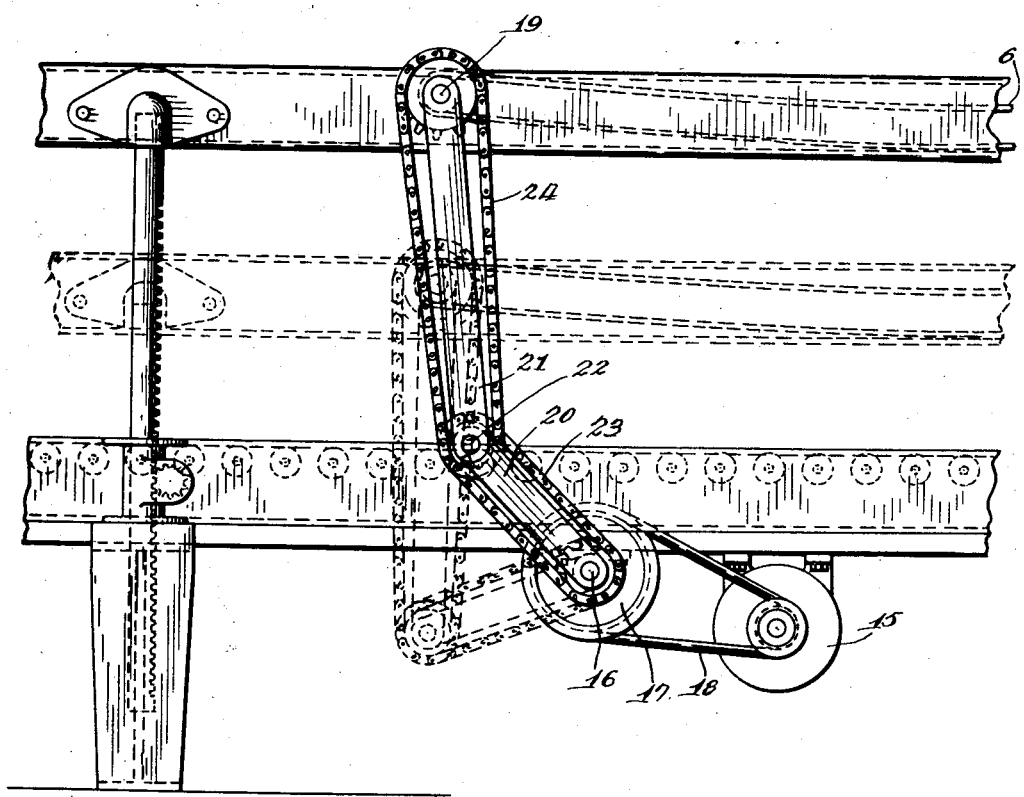
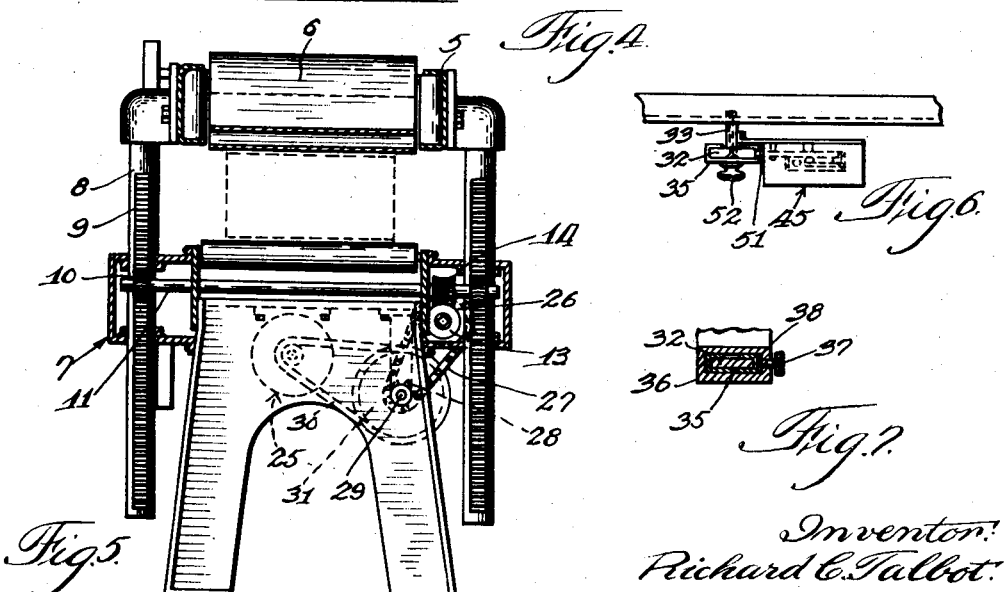
Inventor:
Richard C. Talbot

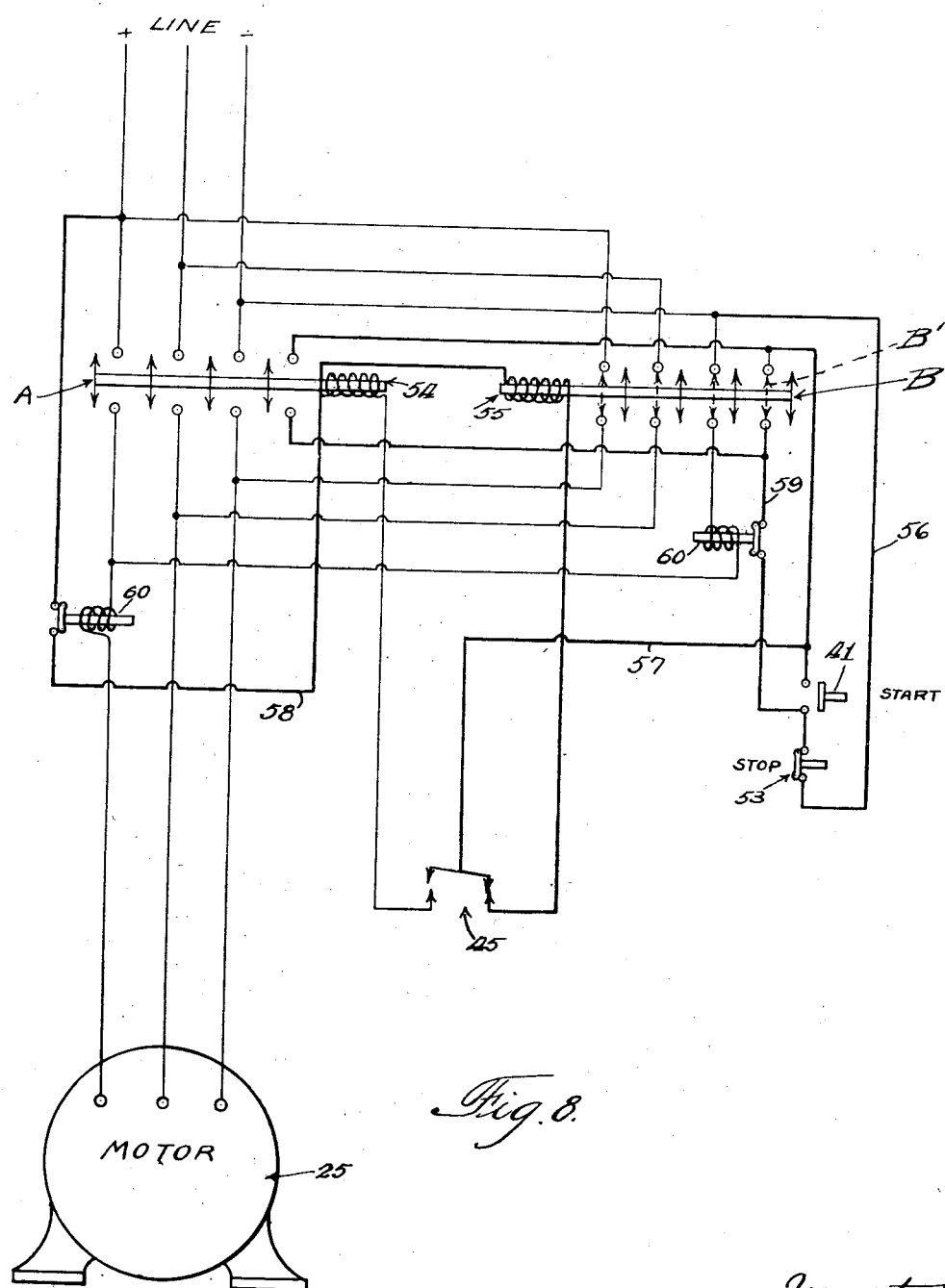

Patented Sept. 26, 1939

2,174,426

UNITED STATES PATENT OFFICE 2,174,426

AUTOMATIC ADJUSTING DEVICE

Richard C. Talbot, Joliet, Ill., assignor to J. L. Ferguson Company, Joliet, Ill., a corporation of Illinois Application July 26, 1937, Serial No. 155,651

14 Claims. (Cl. 93—6)

This invention relates to an adjusting device, and more particularly to a device adapted automatically to adjust the component parts of a conveyor or container sealer, or other similar mechanism adapted to operate upon or convey therethrough containers of various sizes.

In such conveyors or container sealers, it is desirable to handle containers of various dimensions in the same machine. Container sealers or machines of the type to which the present invention is particularly adapted may include vertical or horizontally spaced conveyor belts or other mechanisms adapted to cooperate with the containers passing through the machine. In certain embodiments, such as that specifically illustrated in the drawings, vertically spaced horizontally disposed conveyor members are disclosed between which the containers are moved. The upper member, which may comprise a conveyor belt supported on a suitable frame maintains pressure on the freshly glued container flaps to hold the latter in positive contact with the containers, and accelerate the drying of the adhesive.

Other devices, such as folding and gluing mechanisms, are often supported in parallel relation with a conveyor or other mechanism, and heretofore, it usually has been necessary to manually adjust and secure in adjusted position each of the various members.

This invention overcomes the above noted and other objections, and provides a structure whereby the cooperating conveyors or other mechanisms may securely and adjustably be held in accurate spaced relationship, and may automatically be adjusted to any predetermined spaced relationship without disturbing the parallel alignment of the parts.

It is an object of the present invention to provide an automatic adjustment for conveyor container sealers and the like by which the component parts may automatically be adjusted to any predetermined relationship without the necessity of manual operation of any of the adjusting means.

A further object is the provision of an automatic adjusting mechanism for use in connection with any suitable container sealer, conveyor, or similar device in which an indicating means is provided, whereby the adjustment may accurately be predetermined, and whereafter the entire operation will be automatic and the mechanisms will adjust themselves for cooperating with a predetermined size of container without further attention from the operator.

A further object is the provision of an automatically reversing adjusting mechanism wherein the adjustment automatically reverses the controlling means without the necessity of any reversing device for control by an operator.

Another object is the provision of an adjusting mechanism of the character described, which will be of few parts, cheap to manufacture, easy to install and which will not easily get out of order.

Further objects will be apparent from the specification and the appended claims.

In the drawings:

Fig. 1 is a perspective view of one embodiment of this invention as applied to the conveyors of a container sealer, or similar device.

Fig. 2 is a side elevation of the adjusting scale or adjustment predetermining device, and which in the present embodiment is located on the side of the machine opposite from that illustrated in Fig. 1.

Fig. 3 is a somewhat diagrammatic perspective view of the adjustment predetermining and controlling mechanism illustrated in Fig. 2.

Fig. 4 is a side elevation of the conveyor driving mechanism of the embodiment illustrated in Fig. 1.

Fig. 5 is a transverse sectional view taken on a line substantially corresponding to line 5—5 of Fig. 1.

Fig. 6 is a top view of the switch and scale mechanism illustrated in Fig. 2.

Fig. 7 is a transverse sectional view through the adjustment determining means and is taken on a line substantially corresponding to line 7—7 of Fig. 2.

Fig. 8 is a wiring diagram illustrating the electric control.

Referring to the drawings in detail, the embodiment illustrated comprises a conveyor mechanism, which may be a part of a container sealer or any other suitable mechanism, in which it is desirable to provide automatic adjustment. A lower frame 1 is provided which may be supported on suitable legs 2, and may be provided with horizontal rollers 3 on which containers 4 may be supported as they are passing through the machine for sealing, or for any other desired operations in connection therewith.

An upper frame member 5 is provided with a conveyor belt 6, which is arranged to engage the top of the containers as they pass between the two frame members. The lower frame member, is provided with outwardly extending brackets 7, in which vertical posts 8 are telescopically mounted. These posts 8 provide supporting members for the upper frame 5, and are provided with rack teeth 9 meshing with pinions 10 on transverse shafts 11 (Fig. 5). These transverse shafts are rotatably mounted on the lower frame member 1 and are provided at each end with one of the pinions 10 for engagement with the rack teeth 9. The pinions 10 may be merely gear teeth cut in the shafts 11 if desired.

A longitudinal shaft 12 is rotatably mounted in suitable bearings on the lower frame member 1 as illustrated in Fig. 1, and this shaft 12 is provided, adjacent each of the transverse shafts 11, with a worm 13. Each of the worms 13 is in mesh with a worm wheel 14 on shaft 11. Any suitable number of these supporting posts or racks 8 and their associate transverse shafts 11 may be provided depending upon the length of the machine and the mechanism to be supported and adjusted. It will be apparent that when the shaft 12 is rotated the upper frame will be raised or lowered in accordance with the direction of rotation of the shaft 12.

A motor 15 is secured to the lower framework 1, and may be arranged to drive the upper conveyor belt 6 by means of the transmission illustrated in Fig. 4. It will, of course, be understood that this motor may be arranged to drive any desired folder or sealer mechanism on either the upper or lower frame if desired. However, in the present embodiment, it is illustrated merely as driving the upper conveying belt 6 and provides a suitable self-adjusting driving transmission for driving the belt 6 or any desired mechanism which may be located on the upper frame, when the frame is in any position of adjustment.

A transverse shaft 16 is mounted in suitable bearings on the lower frame and is provided with a pulley 17 which is driven from the motor 15 by means of a belt 18. A transverse conveyor shaft 19 is rotatably mounted on the upper framework 5 and is connected to the lower driving shaft 16 by means of a toggle connection comprising the links 20 and 21, which are pivotally connected together at 22. Rigidly connected sprockets are rotatably mounted at the pivotal connection 22 as illustrated and suitable sprockets on the shafts 16 and 19 are connected thereto by means of chains 23 and 24 respectively. The links 20 and 21 provide a floating toggle connection between the shafts 16 and 19 and support the intermediate sprockets in any position of adjustment, whereby the chains 23 and 24 are always taut and in operative position.

In order to automatically adjust the upper frame 5 relative to the lower frame 1 to accommodate containers of a predetermined height, a second motor 25, preferably a three phase reversible motor, is provided as illustrated in Fig. 5, and this motor is arranged to drive the longitudinal shaft 12 in a predetermined direction by means of a transmission comprising a sprocket 26 on the longitudinal shaft 12 and a chain 27 thereon driven from a sprocket 28 on a countershaft 29, the countershaft 29 being driven from the motor 25 by means of a belt 30 and pulley 31.

The motor 25 is a reversible motor, and may be driven in either direction in accordance with the automatic switching of the circuit connections, and the longitudinal shaft 12 will be operated accordingly to either raise or lower the upper frame 5 in response to a predetermined adjustment of the scale mechanism illustrated particularly in Figs. 2 and 3.

The mechanism for predetermining the adjustment comprises a vertical rectangular bar 32 which is mounted on the upper frame 5 by means of a bracket 33 to which the bar is secured by means of screws 34. A manually adjustable combined scale and switch reversing member 35, which may be in the form of a rectangular split tube, as illustrated in Figs. 3 and 7, is supported on the lower framework 1 by means of a bracket 36, in which the scale 35 is slidably mounted for vertical adjustment. The scale 35 may be secured in any desired adjusted position by means of a thumb screw 37 bearing against a spline 38, which latter in turn bears against the edge of the scale 35, thereby securing it at any desired predetermined adjusted position.

The face of the bracket 36 may be provided with an opening 39 therethrough, and pointers 40 extend into the opening, as shown, and cooperate with suitable graduations or indicia or other markings on the scale, whereby the scale member may be set in accordance with a predetermined size of case or container, or any desired adjustment so that when the motor 25 is started, the mechanism will automatically adjust the device to accommodate the predetermined size of container. As previously stated, the scale 35 may be manually telescoped through the bracket 36, and the depending bar 32, which latter is mounted on the upper frame 1 and extends into the scale member 35, telescopes therein during the automatic adjusting operation.

When it is desired to raise the upper frame 5 to accommodate containers of a desired height, the scale member 35 will be raised to a graduation corresponding to the height of the container, and then secured by means of the thumb screw 37. A push button 41 may then be operated to start the motor 25, and the desired adjustment will automatically be made without further attention by an operator. When it is desired to lower the frame the scale may be lowered as desired and the motor started in the same manner. In either case, when the predetermined automatic adjustment is completed, the control circuit connections are automatically reversed to break the motor circuit and condition the control circuit for the next adjustment.

A motor reversing switch 42 is mounted on the lower frame 1 (Fig. 2) and is preferably arranged for control of a three phase, 60 cycle, 440 volt circuit, whereby the motor 25 may be automatically reversed. A cable 43 leads from the reversing switch to the motor, and a second cable 44, containing certain of the control wires, leads to a control circuit reversing switch 45 mounted on the upper frame 5 adjacent the telescoping bar 32, which latter was previously described as secured to the upper frame. This circuit control reversing switch 45 comprises a two pole switch member 46 pivoted at 47 and connected by means of a link 48 to a lever 49 pivoted at 50, and having its opposite end provided with a roller 51. When the switch is in the position illustrated in Figs. 2 and 3, the roller rests against the edge of the telescoping bar 32, and is retained in this position by a spring 46a. The operation of the lever 49, and the switch member 46 controlled thereby, reverses the connections of the control circuit by moving the switch member 46 at the limit of any automatic adjusting movement of the upper frame, which limit is predetermined by the setting of the scale member 35.

In Fig. 2 the frame 5 is shown in its uppermost position of adjustment. When it is desired to lower the frame, the scale 35 may be lowered by loosening the thumb screw 37 and lowering the scale by means of a knob 52, and securing the scale in its adjusted position by tightening the thumb screw 37. If the starting button 41 is then momentarily operated, the motor will be started and the upper frame will move downwardly until the roller 51 is pushed outwardly by contact with the upper end of the scale member. This outward movement of the roller operates, through the link and lever arrangement shown, to immediately reverse the position of the switch member or blade 46, and to thereby reverse the connections of the control circuit. This reversal simultaneously operates the motor reversing switch 42 to break the motor circuit and condition the device for another adjustment, when the scale is again moved and the push button 41 again operated.

A so-called "stop" push button 53 is also provided for the control circuit whereby the circuit may be manually broken at any time during the automatic movement of the parts, and the motor may thereby be stopped at any time if it is necessary to do so to prevent injury to the machine, or for any other reason.

When it is desired to raise the frame, the adjusting scale is moved upwardly to a desired height with the roller 51 resting thereon, and, when the motor is started, the upper frame automatically moves upwardly until the roller 51 drops off from the end of the scale member, when the switch member 46 will again be reversed and the motor will stop.

Fig. 8 is a wiring diagram illustrating the motor circuit and control circuits therefor. The motor circuit is shown in light lines and the control circuit is shown in heavy lines. The motor reversing switch comprises a solenoid operated 8-pole switch member A and a similar 8-pole switch member B, which may be controlled by means of solenoids 54 and 55 respectively. These switch members are normally open as illustrated, whereby the motor is entirely disconnected from the power circuit, and it will be noted that when the solenoid 54 is energized, the switch member A will move to the right, and the motor will be directly connected to the power circuit for operation in one direction. Also when the switch member B is operated by energizing the solenoid 55, it will move to the left and the power line connections to the motor will be reversed, as illustrated by the dotted line position of the switch member B.

With the control-circuit reversing switch 45 in the position shown in the diagram, the motor may be started by momentarily closing the "start" push button 41 which is normally open, and a control circuit will then be completed from one pole of the power line through a conductor 56, conductor 57, reversing switch 45, solenoid 55 and conductor 58 to the opposite pole of the power line. The solenoid 55 will therefore be energized to move the switch member B to the left to the dotted line position and close the power lines to the motor as indicated. Simultaneously, the right hand switch member contact B' will close the control circuit through the conductors 59 and 57 and the solenoid 55 will therefore remain energized to retain the switch member B in its left hand circuit-closing position until the control switch 45 is reversed by its engagement with, or release from, the scale bar 35. The switch members A and B may be spring controlled for movement to their open position. Therefore, as soon as the solenoid 55 is deenergized by the reversing of the control switch 45, the switch member B will return to its full line position, thereby breaking the motor circuit, and stopping the movement of the upper frame member.

When the controlling switch 45 is in the reverse position from that illustrated in the wiring diagram, the solenoid 54 may be energized in the same manner to move the switch member A to connect the motor directly to the power line. The motor will then operate in a reverse direction from that previously described and move the upper frame member accordingly.

Automatic overload switches 60 are provided in the motor circuits and arranged automatically to break the control circuit in case of overload, so that the operation of the device will be stopped. Also the "stop" push button 53 may be operated at any time to stop the automatic operation.

It will be apparent from the above description that it is only necessary to move the scale 35 to a predetermined position corresponding to the height of the containers to be operated upon, and as soon as the push button 41 is momentarily operated, the machine will automatically be adjusted to bring the parts into a relationship corresponding to the setting of the scale.

While the embodiment illustrated discloses only a vertically adjustable device, it will be understood that the invention is adaptable to relative adjustment of various elements in a horizontal plane or in any desired relationship, and is adaptable to various types of machines.

In the present embodiment, a pair of guide bars 61 and 62 (Fig. 1) are mounted on the lower frame 1 and upper frame 5 respectively by means of brackets 63 and 64. These bars are mounted adjacent the receiving end of the machine and are readily adjustable by means of threaded rods 65 and 66 which are mounted on the brackets and are operatively connected to the guide bars. Each of the threaded rods may be provided with a suitable handle 67 whereby the guide bars may be moved readily by operating the corresponding handle 67. It will be apparent that these guide bars are not essential, but are a convenience in properly directing the containers into the machine.

Modifications may be made without departing from the spirit of the invention. It is therefore desired that the invention be limited only by the prior art and the scope of the appended claims.

Having thus described this invention, what is claimed and desired to be secured by Letters Patent is:

1. In a container handling machine having a plurality of spaced means for operatively engaging containers therebetween and automatically operable means for relative adjustment of said engaging means to accommodate containers of various dimensions, a single means adjustable in accordance with a predetermined container dimension, and automatic means controlled by said last means to limit said automatic relative adjustment from any previous adjustment and in an automatically selected direction to said predetermined dimension.

2. In a container handling machine having spaced members for operatively engaging opposed portions of containers and means for automatic relative adjustment of said members to accommodate containers of various sizes, a single means manually adjustable to correspond with any predetermined size of container within the limits of the machine, and electrical means controlled by said last means to control the direction and limit of automatic adjustment to said predetermined size of container.

3. An automatic container handling machine comprising spaced members for cooperating with containers of a size corresponding with the spacing of said members, mechanism for spacing said members to accommodate any predetermined size of containers within the limits of said machine, a reversible motor for automatically adjusting at least one of said members, a control circuit for said motor, a manually movable indicator for predetermining the direction and limit of adjustment, means automatically controlled by said indicator setting for reversing said control circuit during said automatic adjustment and simultaneously breaking the power circuit to said motor when the predetermined limit of adjustment is reached, and means for starting said motor after each indicator setting whereby said motor is operated in a direction corresponding to the setting of said indicator.

4. An automatic container handling machine comprising spaced members for cooperating with containers of a size corresponding with the spacing of said members, mechanism for spacing said members to accommodate any predetermined size of containers within the limits of said machine, a reversible motor for automatically adjusting at least one of said members, a reversible control circuit for said motor, a manually movable indicator for predetermining an adjustment in either direction, automatic switching means controllable by said indicator to predetermine the control circuit connections to control said motor in accordance with the predetermined direction of adjustment, said indicator and said switching means cooperating to reverse said control circuit connections and stop said motor at the limit of adjustment predetermined by said indicator.

5. A machine of the character described comprising a base member, a movable frame member positioned above said base to receive containers therebetween, rack and pinion connections between said base and said upper member for adjustment thereof, a reversible motor for driving said rack and pinion connections to adjust said frame member in either direction, a reversible motor control circuit, a reversing switch on one of said members for said control circuit, an adjustable indicator on the other of said members, and movable relative to said switch to predetermine the movement of said frame in either direction and the limit of said movement, and means under the control of an operator for starting said motor, said switch and said indicator automatically cooperating during adjustment of said member to limit said movement to a predetermined dimension and to simultaneously reverse said control circuit and stop said motor.

6. A machine of the character described comprising a base member, a movable frame member positioned above said base to receive containers therebetween, rack and pinion connections between said base and said upper member for adjustment thereof, a reversible motor for driving said rack and pinion connections to adjust said frame member in either direction, a reversible motor control circuit, a reversing switch on one of said members for said control circuit, an adjustable indicator on the other of said members and movable relative to said switch to predetermine the direction of movement of said frame and the limit of said movement and arranged to automatically reverse said switch during movement of said frame member, a container handling mechanism on each of said members, and an automatically adjustable transmission between said mechanisms.

7. In a machine of the character described, having opposed members for cooperation with containers of various sizes, mechanism for varying the relationship of said members in either of two directions, a reversible motor for driving said mechanism, a control circuit for said motor, manually operable indicator means for predetermining the direction of adjustment and the limit thereof, and means cooperating with said indicator means to reverse said motor control circuit and to stop said motor when the predetermined limit of adjustment is reached.

8. In a machine of the character described, having opposed members for cooperation with containers of various sizes, mechanism for varying the relationship of said members in either of two directions, adjustment reversing and limiting means movable in accordance with the automatic movement of one of said members, and indicator means manually adjustable relative to said reversing and limiting means to predetermine a desired adjustment, direction and limit, said reversing and limiting means and said predetermining means cooperating to limit said adjustment to said predetermined dimension.

9. In a machine of the character described, having opposed members for cooperation with containers of various sizes, mechanism for automatically varying the relationship of said members in either of two directions, adjustment, reversing and limiting means movable in accordance with the automatic movement of one of said members, means for fixed positioning independent of said movable means for controlling said reversing and limiting means, a container handling mechanism on each of said members and an automatically adjustable transmission between said mechanisms.

10. In a machine of the character described, having opposed members for cooperation with containers of various sizes, mechanism for automatic relative adjustment of said members in either of two directions, a single manually movable means for predetermining the direction of adjustment and simultaneously predetermining the limit of said adjustment in accordance with a desired container dimension, mechanism control means, and means controlled by said limit and direction predetermining means to condition said control means for operation of said mechanism in accordance with the position of said manually movable means.

11. In a container handling machine of the character described, a pair of members automatically adjustable relative to each other in accordance with predetermined container dimensions, a reversible mechanism for adjusting at least one of said members in either direction, a reversing device on one of said members for controlling said mechnism, said reversing device normally tending to condition said mechanism for adjustment in a direction opposite the preceding adjustment, means on said other member and adjustable relative to said reversing device to correspond with a predetermined dimension, said reversing device and said dimension determining means being cooperatively related to determine the direction of adjustment in accordance with the position of the members and the setting of the dimension determining means.

12. In a machine having container engaging members at least one of which is automatically adjustable relative to the other in either of two directions, electrically controlled adjusting mechanism reversible in accordance with a predetermined direction of adjustment, a reversing switch on one of said members and movable therewith, a slidable scale on the other member movable in operating alignment with the operating member of said switch for predetermining a limit of adjustment, said scale and said switch cooperating when the scale is set to determine the direction of adjustment, and said scale and switch cooperating to limit said adjustment to a predetermined container adjustment.

13. In a container-handling machine having members automatically adjustable within a predetermined range to a relationship corresponding to a selected container dimension within said range, means for preselecting a dimension, member-adjusting mechanism operable in accordance with said selected dimension, and automatic contol means for said mechanism, said control means and said preselecting means being constructed and operatively related automatically to determine the direction and limit of member-adjustment in accordance with the preselection.

14. In an automatically adjustable container-handling machine, the combination with a fixed member, a member automatically adjustable to or from said fixed member, and mechanism for adjusting said last member, of a reversing means on one of said members, an adjustment preselecting means on the other member, and means whereby said preselecting means controls said reversing means automatically to determine the direction and limit of automatic adjustment.

RICHARD C. TALBOT.